(12) United States Patent
Hruschak

(10) Patent No.: US 10,920,913 B2
(45) Date of Patent: Feb. 16, 2021

(54) PREMIUM THREADED CONNECTION AND METHOD FOR MAKING SAME

(71) Applicant: ROTARY CONNECTIONS INTERNATIONAL LTD., Nisku (CA)

(72) Inventor: Milton Hruschak, Fort Saskatchewan (CA)

(73) Assignee: ROTARY CONNECTIONS INTERNATIONAL LTD., Nisku (CA)

( * ) Notice: Subject to any disclaimer, the term of this patent is extended or adjusted under 35 U.S.C. 154(b) by 0 days.

(21) Appl. No.: 16/511,566

(22) Filed: Jul. 15, 2019

(65) Prior Publication Data

US 2019/0338871 A1 Nov. 7, 2019

Related U.S. Application Data

(62) Division of application No. 15/691,922, filed on Aug. 31, 2017, now Pat. No. 10,612,701.

(60) Provisional application No. 62/470,541, filed on Mar. 13, 2017.

(51) Int. Cl.

| F16L 15/00 | (2006.01) |
|---|---|
| F16L 9/02 | (2006.01) |
| E21B 17/042 | (2006.01) |
| B23G 1/22 | (2006.01) |
| B23G 1/02 | (2006.01) |
| E21B 7/04 | (2006.01) |
| E21B 43/26 | (2006.01) |
| F16L 15/06 | (2006.01) |

(52) U.S. Cl.
CPC ............ *F16L 15/001* (2013.01); *B23G 1/02* (2013.01); *B23G 1/22* (2013.01); *E21B 17/042* (2013.01); *F16L 9/02* (2013.01); *E21B 7/046* (2013.01); *E21B 43/26* (2013.01); *F16L 15/06* (2013.01)

(58) Field of Classification Search
CPC ........ E21B 17/042; F16L 15/001; F16L 15/06
See application file for complete search history.

(56) References Cited

U.S. PATENT DOCUMENTS

| 4,549,754 A * | 10/1985 | Saunders | E21B 17/042 |
| | | | 285/334 |
| 4,606,681 A * | 8/1986 | Collins | B23G 5/00 |
| | | | 408/215 |
| 4,892,337 A | 1/1990 | Gunderson et al. | |
| 5,143,411 A | 9/1992 | Watts | |
| H1329 H | 7/1994 | Bailey et al. | |

(Continued)

FOREIGN PATENT DOCUMENTS

| CA | 2289097 C | 3/2007 |
| CA | 2478594 C | 9/2011 |

OTHER PUBLICATIONS

Canadian Patent Application No. 2,977,964, Office Action dated Jan. 24, 2020.

(Continued)

*Primary Examiner* — Aaron L Lembo
(74) *Attorney, Agent, or Firm* — Borden Ladner Gervais LLP; Tim Webb

(57) ABSTRACT

A method of converting a tubular having NC46 connections to CET®43 connections. A method of applying a CET®43 thread to a pin connection or a box connection or both. A box connection and a pin connection of the tubular are machined and a CET®43 thread applied to the box connection and the pin connection.

12 Claims, 16 Drawing Sheets

(56) References Cited

U.S. PATENT DOCUMENTS

| | | |
|---|---|---|
| 5,788,401 A | 8/1998 | Drenth |
| 5,908,212 A | 6/1999 | Smith et al. |
| 6,447,025 B1 | 9/2002 | Smith |
| 6,712,402 B2 | 3/2004 | Winship |
| 6,848,724 B2 | 2/2005 | Kessler |
| 7,455,329 B2 | 11/2008 | Muradov et al. |
| 8,181,998 B2 | 5/2012 | Watts |
| 9,683,684 B1 | 6/2017 | Williamson et al. |
| 9,810,029 B2 | 11/2017 | Drenth et al. |
| 9,970,576 B2 | 5/2018 | Williamson et al. |
| 10,253,573 B2 | 4/2019 | Sugino |
| 2004/0073309 A1 | 4/2004 | Bianchi et al. |
| 2005/0248153 A1 | 11/2005 | Sugino et al. |
| 2006/0152000 A1 | 7/2006 | DeLange et al. |
| 2006/0222475 A1 | 10/2006 | Breihan et al. |
| 2008/0302164 A1 | 12/2008 | Bauer et al. |
| 2010/0230958 A1 | 9/2010 | Holland |
| 2013/0220636 A1 | 8/2013 | Drenth et al. |
| 2016/0215571 A1 | 7/2016 | Muradov et al. |
| 2017/0059063 A1 | 3/2017 | Perron |
| 2017/0146160 A1 | 5/2017 | Banker |
| 2017/0321826 A1 | 11/2017 | Watts |
| 2018/0259100 A1 | 9/2018 | Williamson et al. |
| 2018/0320456 A1 | 11/2018 | Muradov et al. |
| 2018/0340378 A1 | 11/2018 | Enderle |
| 2018/0363387 A1 | 12/2018 | Banker |
| 2019/0017634 A1 | 1/2019 | Williamson et al. |
| 2019/0071934 A1 | 3/2019 | Biggerstaff et al. |
| 2019/0072215 A1 | 3/2019 | Douglas et al. |

OTHER PUBLICATIONS

Canadian Patent Application No. 3,071,745, Office Action dated Apr. 6, 2020.

Canadian Patent Application No. 2,977,964, Office Action dated Oct. 11, 2019.

U.S. Appl. No. 15/691,922, Restriction Requirement dated Dec. 3, 2018.

U.S. Appl. No. 15/691,922, Non-Final Office Action dated Jun. 28, 2019.

* cited by examiner

PREMIUM THREADED CONNECTION AND METHOD FOR MAKING SAME

CROSS-REFERENCE TO RELATED APPLICATIONS

This application is a divisional of U.S. patent application Ser. No. 15/691,922, filed Aug. 31, 2017, which claims the benefit of priority of U.S. Patent Application No. 62/470,541 Filed Mar. 13, 2017. Both of these prior applications are incorporate herein by reference in their entirety.

FIELD

The present disclosure relates generally to oil and gas tubulars. More particularly, the present disclosure relates to premium threading of oil and gas tubulars.

BACKGROUND

In the field of earth rock drilling, completion, and servicing, for example to produce oil and/or gas from a subterranean reservoir, the term "tubular" is often used to describe the various pipes. The Schlumberger® Oilfield Glossary at http://www.glossary.oilfield.slb.com describes "tubular" as a generic term pertaining to any type of oilfield pipe, such as drill pipe, drill collars, pup joints, casing, production tubing and pipeline. The related term "connection" is described as any threaded or nonthreaded union or joint that connects two tubular components. The present disclosure relates to threaded connectors/connections for tubulars.

A wide variety of threaded connections are available for tubulars, which may be general purpose connections or premium threaded connections, depending on the operating conditions.

One general purpose threaded connection is NC46, in accordance with American Petroleum Institute (API) 7-1, Specification for Rotary Drill Stem Elements and API 7-2, Specification for Threading and Gauging of Rotary Shouldered Thread Connections. A tubular/threaded connection meeting the NC46 standard will meet a number of technical specifications in terms of dimensions and operating parameters.

General purpose tubulars have been around for years, but as wellbore operations have evolved, higher demands are placed tubulars and connections. Tubulars can be subjected to high temperatures and pressures and other extreme operating conditions, such as high torsional strength, for example in horizontal drilling or hydraulic fracturing operations, and often tubulars having premium threaded connections are required or preferred.

It is, therefore, desirable to provide a premium threaded connector and method for making the premium threaded connector.

SUMMARY

It is an object of the present disclosure to obviate or mitigate at least one disadvantage of previous threaded connections. One aspect of the present disclosure is that one can convert relatively common tubulars having NC46 connections to a higher value, high performance tubular having premium connections, such as CET®43 threads suitable for demanding applications such as horizontal drilling or hydraulic fracturing. Another aspect of the present disclosures is that CET®43 threads provide distinct functional advantages over other threads. CET®43 threads may be applied to new tubulars, used tubulars, or may be freshly cut into metal blanks to be used with tubulars.

In an embodiment disclosed, the threads disclosed herein may be applied to an integral connection (e.g. pin-box) or a threaded and coupled connection (e.g. pin-coupling-pin, as in oil country tubular goods (OCTG)). The threads disclosed herein may be applied to a new tubular or a recycled or re-used or repurposed tubular as described herein.

In a first aspect, the present disclosure provides a method including providing a tubular having an NC46 box connection and an NC46 pin connection, reducing a box outer diameter of the NC46 box connection and enlarging a box inner diameter of the NC46 box connection to provide a prepared box connection, applying a box premium thread to the prepared box connection, reducing a pin outer diameter of the NC46 pin connection and enlarging a pin inner diameter of the NC46 pin connection to provide a prepared pin connection, and applying a pin premium thread to the prepared pin connection, wherein the tubular is provided with a box premium connection and a pin premium connection.

In an embodiment disclosed, the box premium thread comprises a CET®43 box thread, wherein the pin premium thread comprises a CET®43 pin thread, and wherein the box premium connection and the pin premium connections are CET®43 connections.

In an embodiment disclosed, the method further includes heating a hardband portion of the NC46 box connection to about 950 degrees Fahrenheit prior to reducing the outer diameter.

In an embodiment disclosed, the method further includes phosphating the CET®43 connections.

In an embodiment disclosed, the method further includes applying a make and break process to the CET®43 connections.

In an embodiment disclosed, the CET®43 connections have an outer diameter of about 5.375" and the CET®43 connections have an inner diameter of about 3".

In an embodiment disclosed, the CET®43 box threads have a pitch of about 0.25" (4 TPI), an angle of about 60 degrees, a crest to root height of about 0.092500", a taper of about 1.5 in/ft, a crest width of about 0.067", and a root width of about 0.076".

In an embodiment disclosed, the CET®43 pin threads have a pitch of about 0.25" (4 TPI), an angle of about 60 degrees, a crest to root height of about 0.092504", a taper of about 1.5 in/ft, a crest width of about 0.076", and a root width of about 0.067".

In an embodiment disclosed, the tubular is previously used or is reconditioned.

In an embodiment disclosed, the method further includes performing a wellbore operation using the tubular having CET®43 connections.

In an embodiment disclosed, the wellbore operation comprises horizontal drilling or hydraulic fracturing or both.

In a further aspect, the present disclosure provides a method of converting a tubular having NC46 connections to CET®43 connections, including providing the tubular, having an NC46 box connection and an NC46 pin connection, heating a hardband portion of the NC46 box connection to about 950 degrees Fahrenheit and reducing a box outer diameter of the NC46 box connection, enlarging a box inner diameter of the NC46 box connection, wherein a prepared box connection is provided, applying a CET®43 box thread to the prepared box connection, wherein the CET®43 threads have a pitch of about 0.25" (4 TPI), an angle of about 60 degrees, a crest to root height of about 0.092500", a taper of about 1.5 in/ft, a crest width of about 0.067", and a root width of about 0.076", reducing a pin outer diameter of the NC46 pin connection, enlarging an inner diameter of the pin connection, wherein a prepared pin connection is provided, and applying a CET®43 pin thread to the prepared pin connection, wherein the CET®43 threads have a pitch of about 0.25" (4 TPI), an angle of about 60 degrees, a crest to root height of about 0.092504", a taper of about 1.5 in/ft, a crest width of about 0.076", and a root width of about 0.067".

In an embodiment disclosed, the CET®43 connections have an outer diameter of about 5.375" and the CET®43 connections have an inner diameter of about 3".

In a further aspect, the present disclosure provides a method to recut a tubular having CET®43 threaded connections, including providing the tubular having CET®43 threaded connections; and re-cutting CET®43 threads, wherein a remaining tong length exceeds a predetermined minimum tong length after re-cutting.

In a further aspect, the present disclosure provides a CET®43 box connection for a first tubular, including a box shoulder stop, a box shoulder bearing surface, a face bearing surface, a face stop, and CET®43 box threads extending between the face bearing surface and the box shoulder bearing surface, wherein the CET®43 box connection is adapted to mate with a CET®43 pin connection of a second tubular, wherein the box shoulder bearing surface is adapted to retain a corresponding nose bearing surface of the CET®43 pin connection.

In an embodiment disclosed, the face bearing surface is adapted to retain a corresponding pin shoulder bearing surface of the CET®43 pin connection.

In an embodiment disclosed, the face stop and the pin shoulder stop are adapted to abut, the nose and the box shoulder stop are adapted to abut, or both.

In an embodiment disclosed, an annular space between the box shoulder bearing surface and the nose bearing surface defines a first bearing gap.

In an embodiment disclosed, an annular space between the tail bearing surface and the face bearing surface defines a second bearing gap.

In an embodiment disclosed, the first bearing gap or the second bearing gap or both are in the range of about 0.01" to about 0.10". In an embodiment disclosed, the first bearing gap or the second bearing gap or both are about 0.020".

In an embodiment disclosed, the CET®43 box threads have a pitch of about 0.25" (4 TPI), an angle of about 60 degrees, a crest to root height of about 0.092500", a taper of about 1.5 in/ft, a crest width of about 0.067", and a root width of about 0.076".

In a further aspect, the present disclosure provides a CET®43 pin connection for a first tubular, including a nose, a nose bearing surface, a pin shoulder bearing surface, a pin shoulder stop, and CET®43 pin threads extending between the nose bearing surface and the pin shoulder bearing surface, wherein the CET®43 pin connection is adapted to mate with a CET®43 box connection of a second tubular, wherein the nose bearing surface is adapted to be retained by a mating box shoulder bearing surface of the CET®43 box connection.

In an embodiment disclosed, the pin shoulder bearing surface is adapted to be retained by a mating face bearing surface of the CET®43 box connection.

In an embodiment disclosed, the face stop and the pin shoulder stop are adapted to abut, the nose and the box shoulder stop are adapted to abut, or both.

In an embodiment disclosed, an annular space between the box shoulder bearing surface and the nose bearing surface defines a first bearing gap.

In an embodiment disclosed, an annular space between the tail bearing surface and the face bearing surface defines a second bearing gap.

In an embodiment disclosed, the first bearing gap or the second bearing gap or both are in the range of about 0.01" to about 0.10". In an embodiment disclosed, the first bearing gap or the second bearing gap or both are about 0.020".

In an embodiment disclosed, the CET®43 pin threads have a pitch of about 0.25" (4 TPI), an angle of about 60 degrees, a crest to root height of about 0.092504", a taper of about 1.5 in/ft, a crest width of about 0.076", and a root width of about 0.067".

In a further aspect, the present disclosure provides a tubular having CET®43 connections, comprising a CET®43 box connection and a CET®43 pin connection.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for providing a tubular having CET®43 connections, and in a particular embodiment, converting a tubular from NC46 connections to CET®43 connections.

Figure 1:
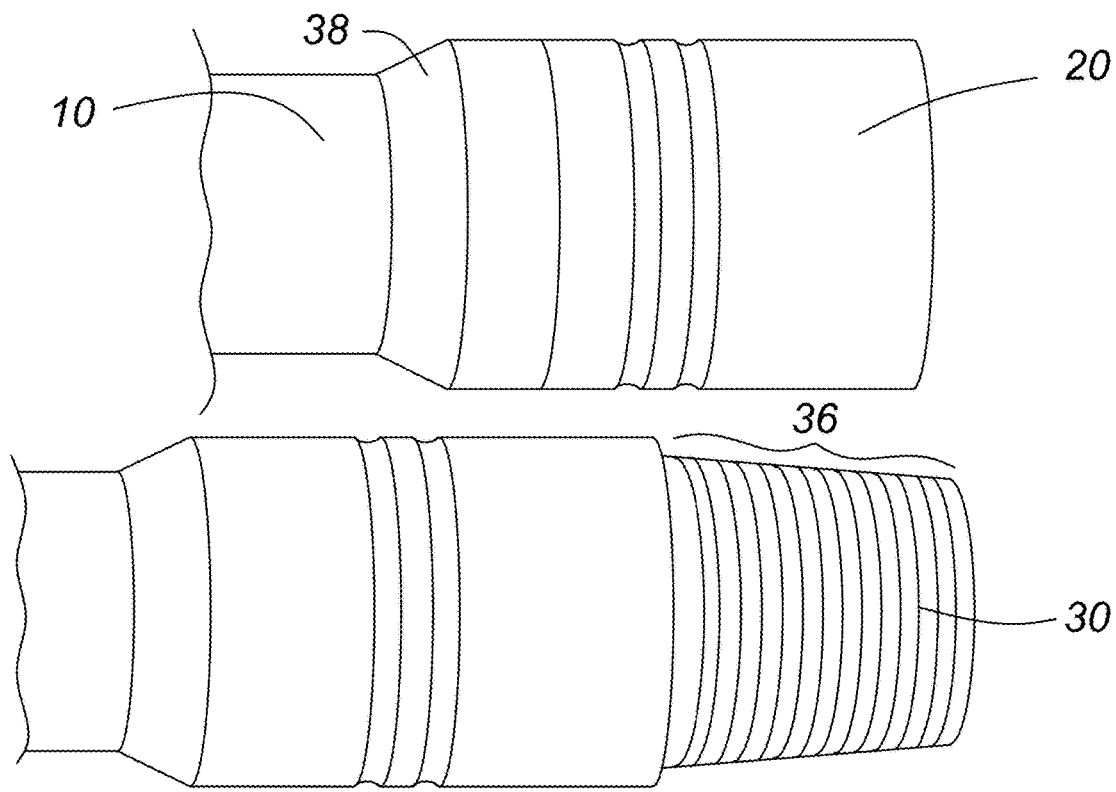
FIG. 1 is a portion of tubulars having NC46 pin connections and NC46 box connections.

Referring to FIG. 1, a receiving inspector inspects a tubular 10 and any identification marks, such as work order numbers, serial numbers, purchase order numbers, or anything stenciled or stamped onto the tubular 10. Serial numbers are recorded and written back on the tubular 10 on both sides. The tubular 10 may have an NC46 box connection 20, an NC46 pin connection 30, or both.

In an embodiment disclosed, the materials must be within a specified yield strength, for example 130 ksi minimum.

In an embodiment disclosed, NC46 refers to American Petroleum Institute (API) 7-1, Specification for Rotary Drill Stem Elements and API 7-2, Specification for Threading and Gauging of Rotary Shouldered Thread Connections or other applicable specification, and specifically API Numbered Connection 46 (NC46), for example having 4 threads per inch (TPI), 2" taper per foot (TPF), and thread gauge V-0.038R.

The tubular 10 is loaded onto an inbound rack where the process of converting the tubular from NC46 connections to CET®43 connections begins.

PIN Connection

Figure 2:
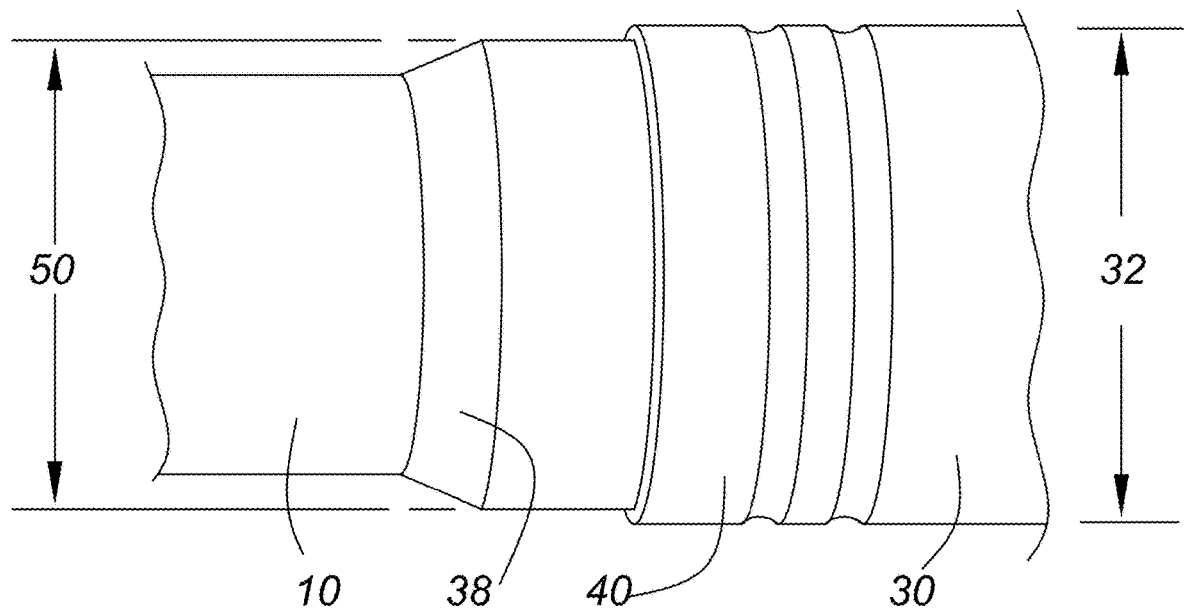
FIG. 2 is a portion of a tubular having a NC46 pin connection, with a portion of hardbanding removed.

Referring to FIG. 2, any hardbanding 40 is removed (NC46 pin connection 30 shown), for example by computer numeric control (CNC) lathe or machining tool. The hardbanding 40 may be removed, for example, using a CDN43 insert. The length 36 (see FIG. 1) may be checked. The CNC controlled lathe or machining tool then makes two additional passes to machine the outer dimension to comply with print specifications. The outer diameter 32 of the NC46 pin connection is machined to provide a reduced outer diameter 50 (the hardbanding 40 shown only partially removed). The particular example tubular 10 shown, calls for a CET®43 pin connection 80 having a 5.375" outer diameter, which the CNC lathe or machining tool is programed to do using an SNMG 644 insert.

Figure 3:
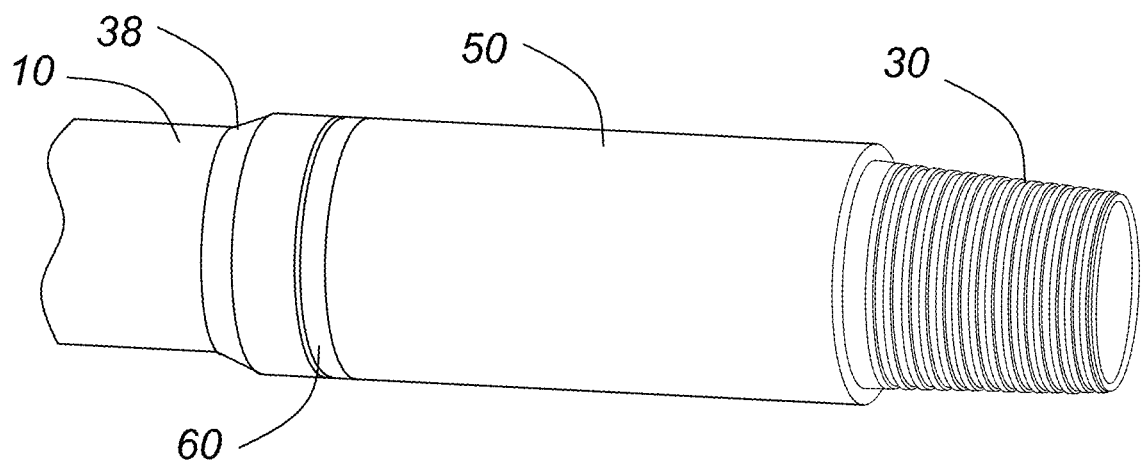
FIG. 3 is the NC46 pin connection of FIG. 2, with the hardbanding removed and an identification groove applied.

Referring to FIG. 3, the outer diameter 32 of the NC46 pin connection 30 has been machined to provide the reduced outer diameter 50 (for example 5.375"), and an identification groove 60 is provided (e.g. machined) at a predetermined location from taper 38 (for example 2 inches from an 18 degree taper shown). A DNMG 432 insert is used in this process. The machine operator then inspects the identification groove 60 to confirm compliance with print specifications (normally 0.0625" deep).

Figure 4:
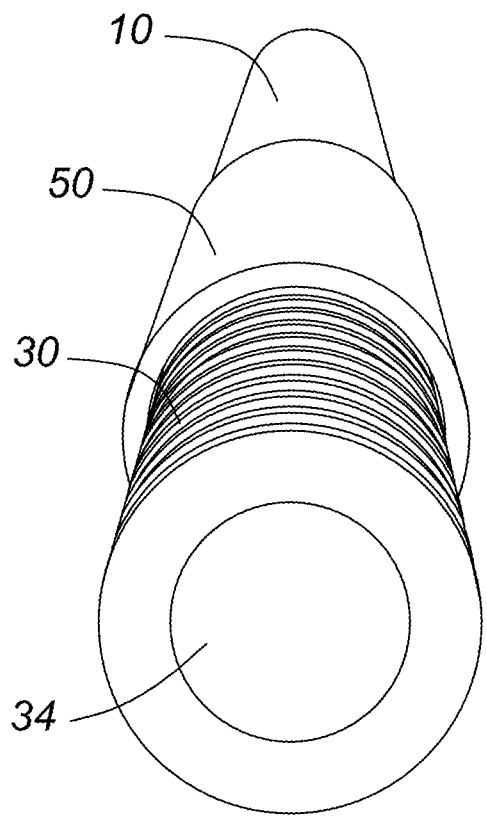
FIG. 4 is the NC46 pin connection of FIG. 3, before the inner diameter is enlarged.

Referring to FIG. 4, once the reduced outer diameter 50 has been reduced, for example by machining, the tubular 10 may be kicked out to the next CNC machine. While on the rack, the machine operator may measure the inner diameter 34 of the NC46 pin connection 30 and determine which program to run to enlarge the inner diameter 34, for example by boring. This particular NC46 pin connection 30 has a 2.750" inner diameter and must be enlarged or bored out to 3" inner diameter to meet the requirements of a CET®43 pin connection 80.

Figure 5:
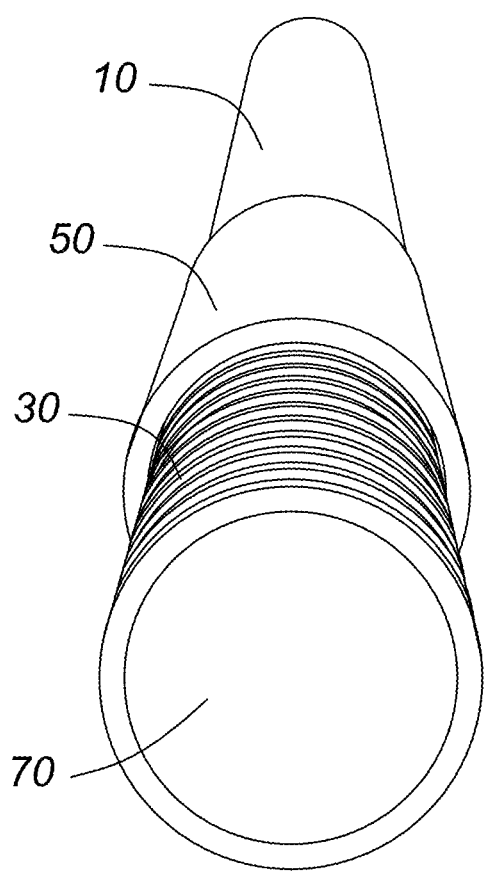
FIG. 5 is the NC46 pin connection of FIG. 4, after the inner diameter has been enlarged.

Referring to FIG. 5, the CNC machine, using a 2.500" boring bar with an SNMG644 insert, enlarges the inner diameter 34 of the pin connection 30 to provide a enlarged inner diameter 70 to meet print specifications. If it does not meet specifications, the operator does one skim pass to make it compliant. After this process, a drift is inserted 4 feet. If the drift comes back clean, the enlarging process is complete. For example, for a 3" enlarged inner diameter 70, a 2.875" drift may be used.

Figure 6:
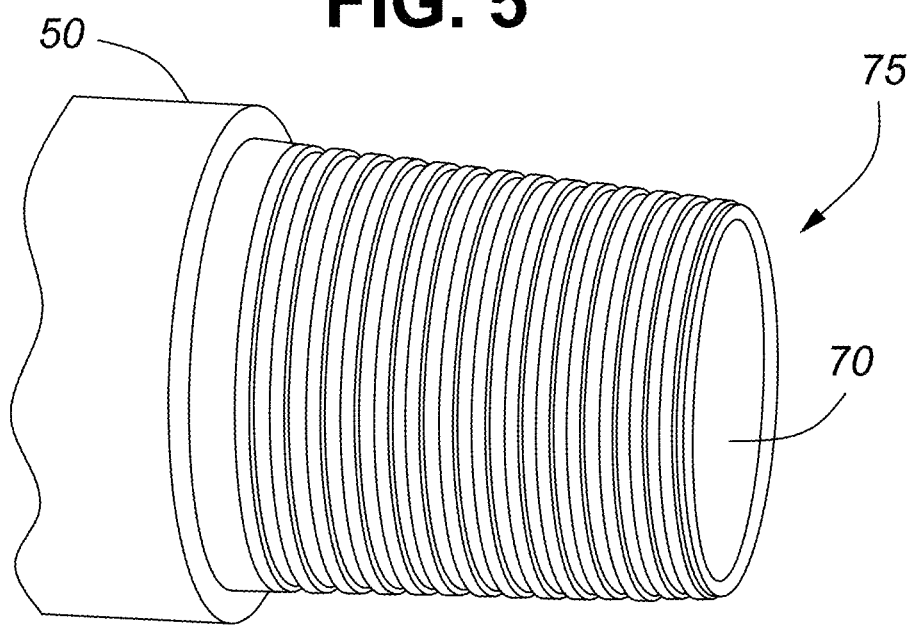
FIG. 6 is the NC46 pin connection of FIG. 5, having a prepared pin connection, before threading.

Referring to FIG. 6, once the reduced outer diameter 50 and the enlarged inner diameter 70 are complete, the machine operator may ensure the reduced outer diameter 50 and the enlarged inner diameter 70 are concentric, and the prepared pin connection 75 is ready for the threading process. While on the rack, the enlarged inner diameter 70 is visually inspected to see if there is any debris or shavings left over from the boring process. The tubular 10 is then blown out to ensure that it is clean. The pin connection 30 is prepared and is ready for CET®43 threads to be applied. A face off tool using an CNMG543 insert is used for the first cut. A rough profile cut is made using an VNMG432 insert is used to cut the profile to print specifications. Threads are cut using an LDS544 insert. Sharp corners of imperfect threads from start to full form threads by machining are cut using an NRK54 insert. The flat width must not exceed crest width. The inner diameter break is cut using an CNMG432 insert. The machine operator inspects, using a CET®43 ring gage, that the threads are machined to print specifications. Gage standoff, pin and nose cylinder diameter, bevel diameter and pin length dimensions are recorded on inspection reports and any non-conformance is reported to quality control (QC) and dispositioned accordingly. Any required stamping is applied after the pin thread is inspected (e.g. serial number, hardbanding stamp, connection, etc.).

Figure 7:
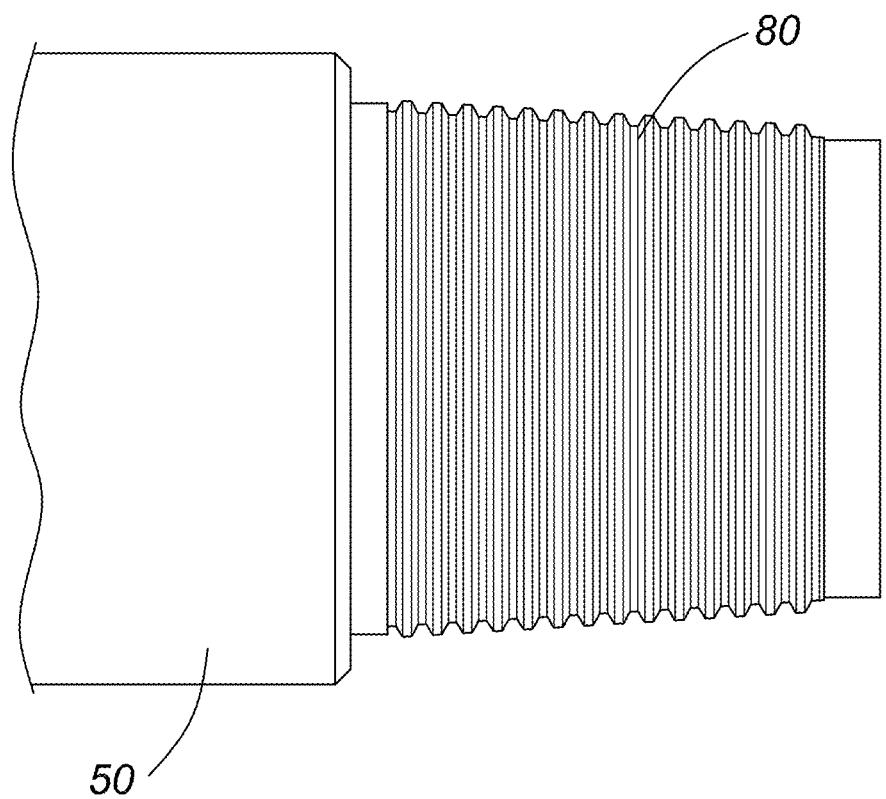
FIG. 7 is the NC46 pin connection of FIG. 6, with the NC46 pin connection converted to a CET®43 pin connection.

Referring to FIG. 7, the prepared pin connection 75 has been threaded with CET®43 threads to provide a CET®43 pin connection 80. CET®43 pin thread protectors (not shown) may be applied.

PIN Connection CET®43 Threads

Referring to FIGS. 7-10, and 18-19, a CET®43 pin connection 80 is shown, of a specific size. However, CET®43 threads may be applied in different sizes.

In an embodiment disclosed, the CET®43 threads provide 5¼ turns to make-up, have 170-200% of the torsional strength of American Petroleum Institute (API) connections, and may be applied to various tubulars, including drill pipe, heavy-weight drill pipe and collars for use on work strings, slimhole drillstrings and frac strings.

The CET®43 threads provide high torque, high threads per inch (TPI), reduced shoulder and nose length.

The CET®43 threads may be applied to a wide variety of tubular/pipe sizes, including but not limited to 4½", 5", 5½", 6⅝", and 7⅝" pipe outer diameter.

In an embodiment disclosed, the CET®43 connection has an outer diameter of 5.375", an inner diameter of 3", a recommended make-up torque of 24,400 ft-lbs, a tensile yield strength of 805,800 lbs, and a torsional yield strength of 37,500 ft-lbs.

Figure 8:
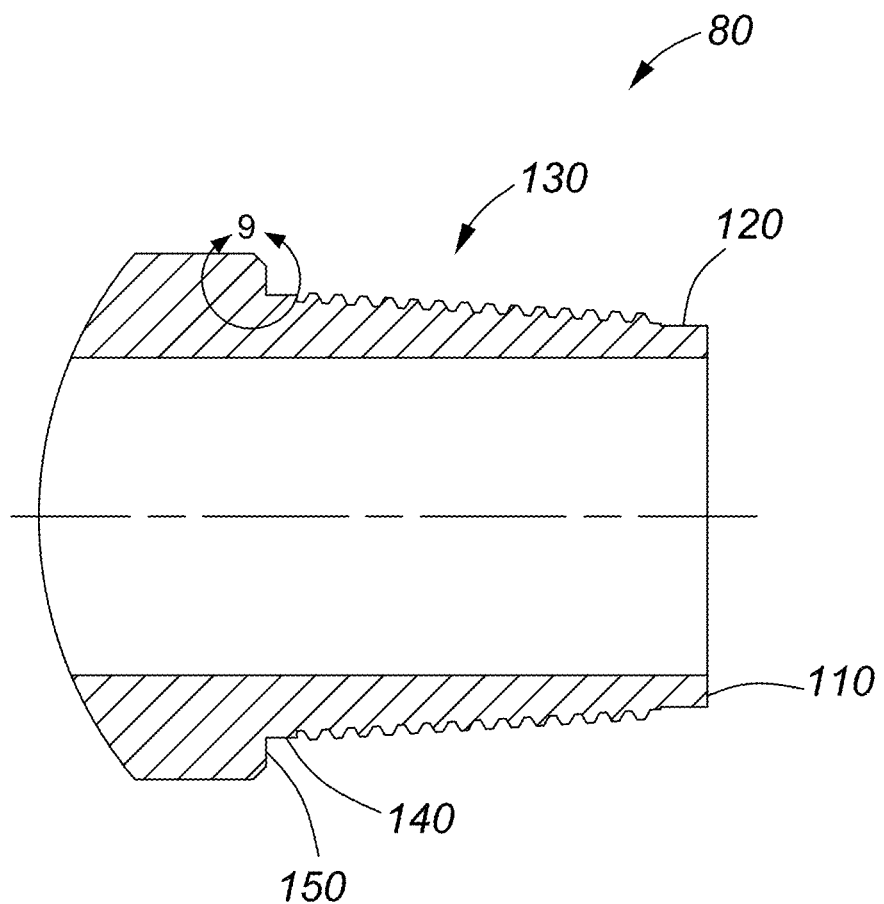
FIG. 8 is a drawing of a CET® 43 pin connection.

Referring to FIG. 8, the CET®43 pin connection 80 has a nose bearing surface 120 of relatively short length, tapered thread 130, and a pin shoulder bearing surface 140 of relatively short length. In an embodiment disclosed, the length of the nose bearing surface 120 is about 0.5". In an embodiment disclosed, the length of the pin shoulder bearing surface 140 is about 0.5" or less (measured from the pin shoulder stop 150 to the flank of the first full depth thread). In an embodiment disclosed, the distance between the nose 110 and the pin shoulder stop 150 is about 4.5". In an embodiment disclosed, the diameter of the nose bearing surface 120 is about 3.876". In an embodiment disclosed, the diameter of the pin shoulder bearing surface 140 is about 4.522".

Figure 9:
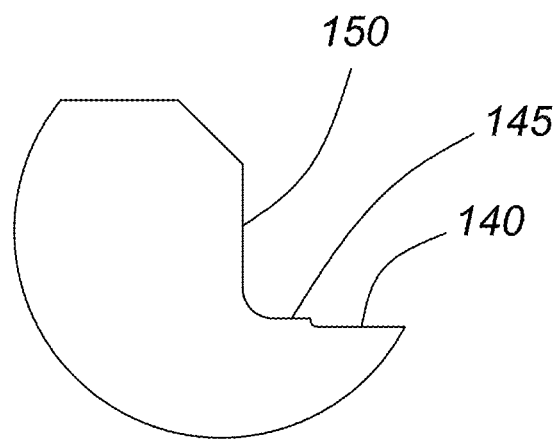
FIG. 9 is a detail of FIG. 8.
Figure 15:
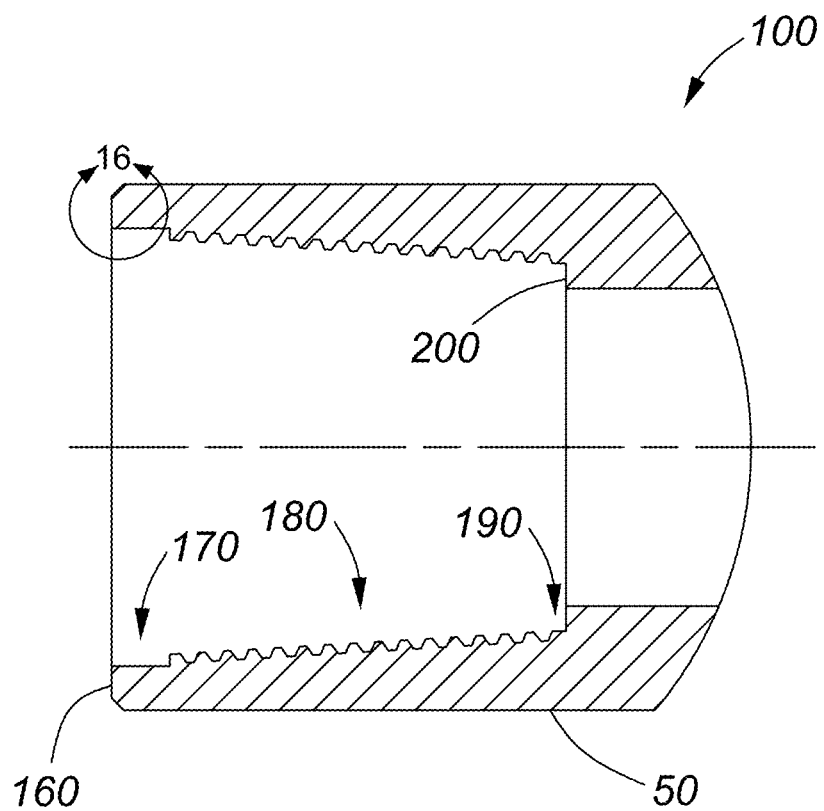
FIG. 15 is a drawing of a CET® 43 box connection.

Referring to FIG. 9, in an embodiment disclosed the pin shoulder bearing surface 140 includes a reduced clearance portion 145 adapted to form a tight fit with the mating face bearing surface 170 of the mating CET®43 box connection 100 (see FIG. 15). In an embodiment disclosed, the tight fit is an interference fit. In an embodiment disclosed, the reduced clearance portion 145 has a length of about 0.125".

Figure 10:
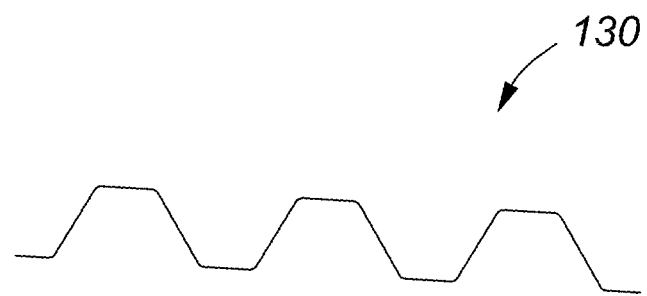
FIG. 10 is a detail of FIG. 8.

Referring to FIG. 10, in an embodiment disclosed the tapered threads 130 have a pitch of about 0.25" (4 TPI), an angle of about 60 degrees, a crest to root height of about 0.092504" and a taper of about 1.5 in/ft. In an embodiment disclosed the crest width is about 0.076" and the root width is about 0.067". In an embodiment disclosed the tapered threads 130 conform to thread gauge V-0.076 thread form design data.

BOX Connection

Figure 11:
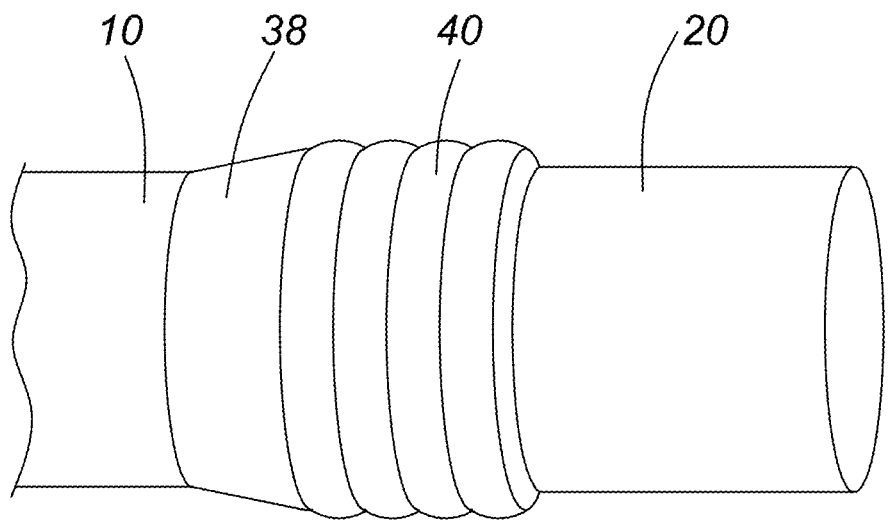
FIG. 11 is a portion of a tubular having an NC46 box connection.

Referring to FIG. 11, a receiving inspector inspects the outer diameter 22, inner diameter 24, hardbanding 40, and identification marks (if any) of the tubular 10. The length 26 of the threads may be checked. The tubular 10 has at least one NC46 box connection 20.

The tubular 10 is loaded onto an inbound rack where the process of converting the tubular from NC46 connections to CET®43 connections begins.

Figure 12:
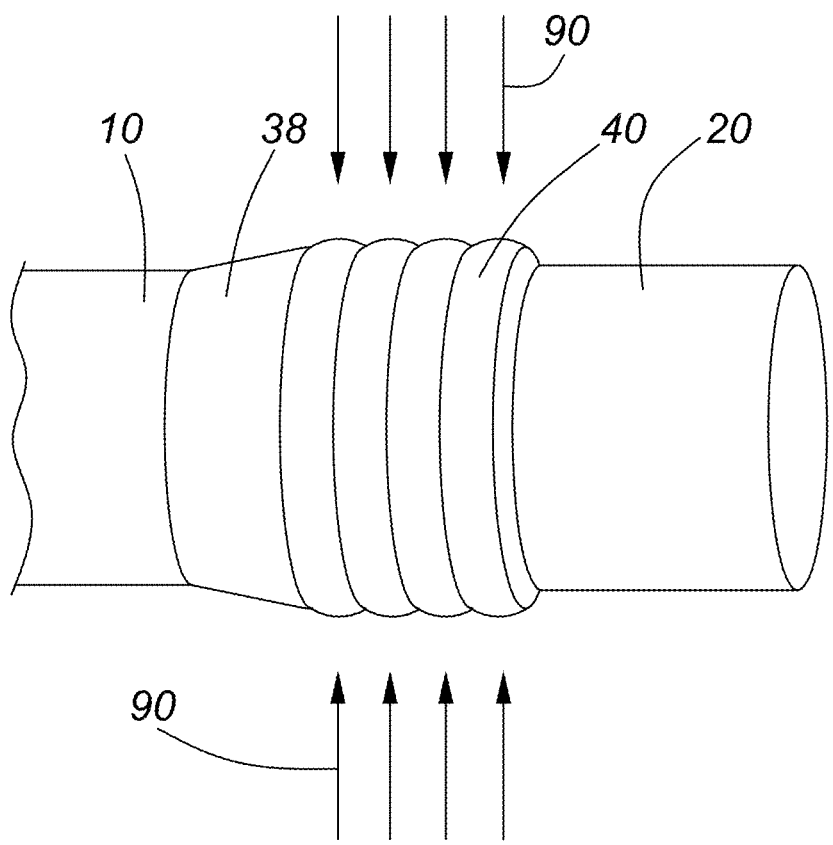
FIG. 12 is the NC46 box connection of FIG. 11, being heated.

Referring to FIG. 12, the hardbanding 40, if any, is heated to about 950° Fahrenheit by applying heat 90. This process is only necessary on the box end, as the hardbanding 40 is longer (three 1" bands on the box end as opposed to two 1" bands on the pin end). The heating softens the hardbanding 40 enough to enable it to be cut using an CBN43 insert. The CNC machine then makes two additional passes to machine to print specifications to provide a reduced outer diameter 50. This particular example CET®43 box connection 100 calls for a 5.375" outer diameter, which the CNC is programed to do using an SNMG 644 insert.

Figure 13:
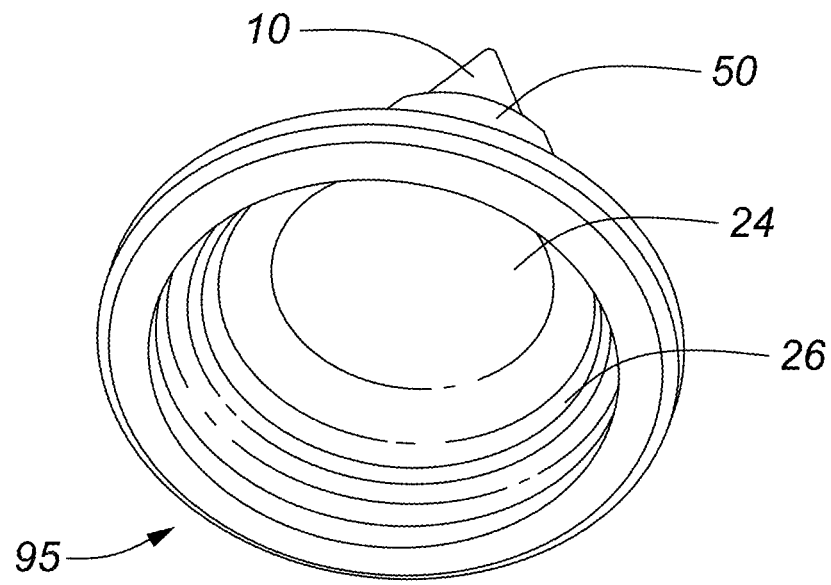
FIG. 13 is the NC46 box connection of FIG. 12, after the hardbanding has been removed and the outer diameter has been reduced.

Referring to FIG. 13, the machine operator visually inspects the inner diameter 24 on the box end connection for shavings and debris. The machine operator visually inspects the outer diameter and uses an outer diameter micrometer set to 5.375" to verify the reduced outer diameter 50 meets the print specifications, to provide a prepared box connection 95.

A face off tool using an CNMG543 insert is used for the first cut. A 2" boring bar using an CNMG431 insert is used to bore the inner diameter 34 to print specifications. Threads are cut using a threading bar with an LDS544 insert. Sharp corners of imperfect threads from start to full form threads by machining are cut using an NLK54 insert. The flat width must not exceed the crest width. The inner diameter break is cut using an CNMG432 insert. The machine operator inspects the tapered threads 130, using a CET®43 plug gage, to ensure that the threads are machined to print specifications. The gage standoff, counter bore diameter, inner diameter, bevel diameter and box thread depth dimensions are recorded on inspection reports and any non-conformance is reported to quality control (QC) and dispositioned accordingly. CET®43 box thread protectors are applied and the pipe or tubular 10 is ready for the next step.

Figure 14:
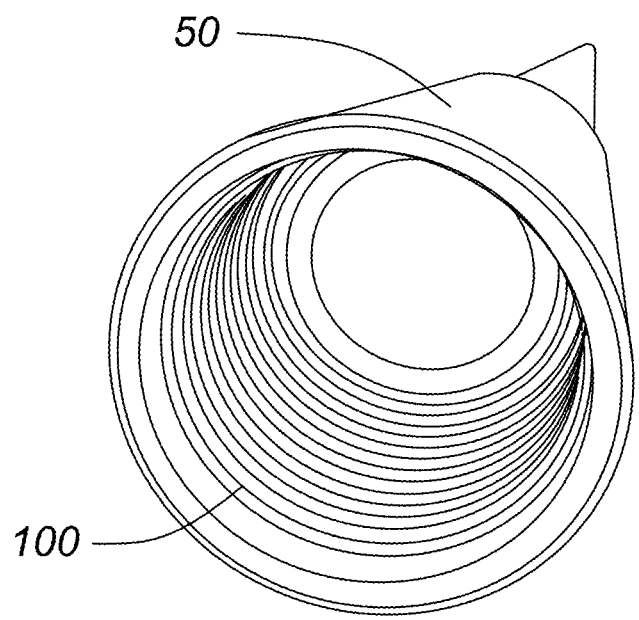
FIG. 14 is the NC46 box connection of FIG. 13, with the NC46 box connection converted to a CET®43 box connection.

Referring to FIG. 14, a CET®43 thread has been applied to the prepared box connection 95 and a CET®43 box connection 100 is provided.

BOX Connection CET®43 Threads

Referring to FIGS. 14-19, a CET®43 box connection 100 is shown, of a specific size. However, CET®43 threads may be applied in different sizes.

In an embodiment disclosed, the CET®43 threads provide 5¼ turns to make-up, have 170-200% of the torsional strength of American Petroleum Institute (API) connections, and may be applied to various tubulars, including drill pipe, heavy-weight drill pipe and collars for use on work strings, slimhole drillstrings and frac strings.

The CET®43 threads provide high torque, high threads per inch (TPI), reduced shoulder and nose length.

The CET®43 threads may be applied to a wide variety of pipe sizes, including but not limited to 4½", 5", 5½", 6⅝", and 7⅝" pipe outer diameter.

In an embodiment disclosed, the CET®43 connection has an outer diameter of 5.375", an inner diameter of 3", a recommended make-up torque of 24,400 ft-lbs, a tensile yield strength of 805,800 lbs, and a torsional yield strength of 37,500 ft-lbs.

Referring to FIG. 15, in an embodiment disclosed, the CET®43 box connection 100, extends between a face stop 160 and a box shoulder stop 200, and includes a face bearing surface 170, tapered thread 180, and a box shoulder bearing surface 190. In an embodiment disclosed, the face bearing surface is about 0.625" wide. In an embodiment disclosed, the box shoulder bearing surface 190 is about 0.375" wide. In an embodiment disclosed, it is about 4.125" or more from the face stop 160 to the flank of the first full depth thread (proximate the box shoulder stop 200. In an embodiment disclosed, it is about 4.5" between the face stop 160 and the box shoulder stop 200. In an embodiment disclosed, the reduced outer diameter 50 is about 5.125". In an embodiment disclosed, the counterbore/face bearing surface 170 has a diameter of about 4.617". In an embodiment disclosed, the box shoulder bearing surface has a diameter of about 3.973".

Figure 16:
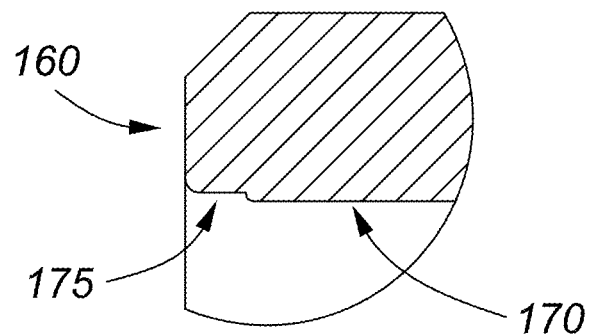
FIG. 16 is a detail of FIG. 15.

Referring to FIG. 16, in an embodiment disclosed, the CET®43 box connection 100 includes an enlarged guide portion 175 between the face stop 160 and the face bearing surface 170. In an embodiment disclosed, the enlarged guide portion is about 0.125" wide.

Figure 17:
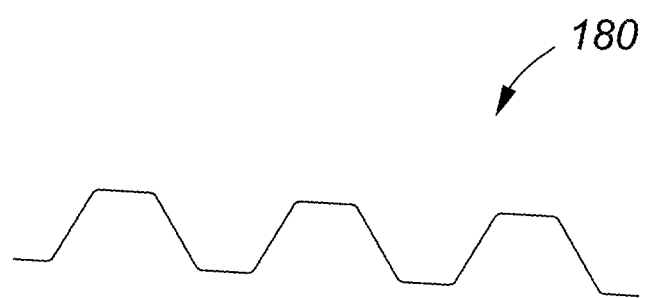
FIG. 17 is a detail of FIG. 15.

Referring to FIG. 17, in an embodiment disclosed the tapered threads 180 have a pitch of about 0.25" (4 TPI), an angle of about 60 degrees, a crest to root height of about 0.092500" and a taper of about 1.5 in/ft. In an embodiment disclosed the crest width is about 0.067" and the root width is about 0.076". In an embodiment disclosed the tapered threads 130 conform to thread gauge V-0.076 thread form design data.

Zinc Phosphate

The tubular, having a CET®43 box connection 100 and a CET®43 pin connection 80 may be subject to a surface treatment, such as a zinc phosphate process. The purpose of this process is to ensure the tubular 10 or tool joint has the correct structure and thickness, unit weight per area, adheres and imparts the correct lubricity for repeated thread seals and make/breaks under torque without galling. Once both the pin and box are threaded, they are cleaned. The parts must be clean of metal working fluid, grease, oil, rust, paint, and any other contaminant prior to phosphate coating. This can be done using flow over cleaning stations or brush and bucket cleaning using alkaline detergents. Alternative methods include abrasive blasting or wire wheel buffing. After cleaning the CET®43 pin connection 80 and the CET®43 box connection 100, they are rinsed with fresh water to remove any detergent residue. Conversely, any blasting media should be blown out as well to avoid any cross contamination into the zinc phosphate solution. After cleaning and rinsing, the CET®43 pin connection 80 and box connection 100 are positioned at the application area (rolling rack with an immersion tank containing a suitable zinc phosphate solution, such as Solucoat 5027J, which is a liquid concentrated zinc phosphate for immersion, spray or flow coat processing of iron, steel, and zinc. The zinc phosphate will impart a tight crystalline coating and can be used as a base for paint, or supplementary oil finish). The operator ensures the zinc phosphate is contained during the coating process. The tubular 10 is elevated at the rear to drain the phosphate back into the heated tank. The operator ensures the application nozzles wet the entire tubular 10 and connections. Any phosphate water break will slow the reaction time down or force the operator to rotate the part for complete saturation. The operator ensures the phosphate solution is not applied using too much pressure. Too much pressure will blow the phosphate solution/coating off before it has a chance to root. Pumps must be sized for high volume flood instead of pressure. If the phosphate splashes back at the operator, the pressure is too high for successful coating. Three things are most important when processing zinc phosphate: phosphate solution concentration, solution temperature, and time. These parameters are altered slightly to adjust for the flow over application technique. Once the CET®43 pin connection 80 and the CET®43 box connection 100 are flow coated in a Solucoat 5027J solution (20 to 30 min at 175+/−25° F.), the connections are ready for a connection make and break process and final inspection.

Connection Make and Break

All make and break shall be done after phosphating or other approved surface treatment. The operator removes and cleans the thread protectors since they may be re-used but possibly without any or a different thread compound. The threads and torque shoulder(s) are pre-cleaned, ensuring all oil, dust and other contaminates are removed. The operator pre-inspects threads and shoulders for nicks and burrs. Minor ones can be removed with a deburring tool, file or honing stone. A coating of a thread compound is applied evenly to both the pin and box connection make-up shoulders and threads using a stiff bristle brush to spread and work in a thin uniform coating.

Each of the CET®43 pin connection 80 and the CET®43 box connection 100 are carefully stabbed and made up hand tight to avoiding cross threading or damage to threads and shoulders. The hand tight assembled components are placed in the make and break unit and secured with jaws in the headstock, ensuring the tong jaws are not on any raised hardbanding and are positioned at the center of the tong space and at least 2 inches from the box shoulder bearing surface 190/box shoulder stop 200 region so as to avoid crushing or other damage. Avoid positioning the jaws at any location where mill identification markings/stamping will be removed.

Power is then applied to make up a connection between a CET®43 pin connection 80 and a CET®43 box connection 100, at a maximum of 60 RPM.

Make and Break three times as follows:

1. Make to 60% of nominal make up torque (MUT) with specified plus/minus tolerance.

Break (monitor breakout torque does not exceed 90% MUT).

2. Make to 80% of nominal MUT with specified plus/minus tolerance.

Break (monitor breakout torque does not exceed 90% MUT).

3. Make to 100% of nominal MUT with specified plus/minus tolerance.

Break (monitor breakout torque does not exceed 90% MUT).

In an embodiment disclosed, the box diameter is substantially 6.25", the pin inner diameter is 3.25", and the required torque is 42,400 ft-lbs.

The operator then separates the box connection and the pin connection and cleans threads and torque shoulders. An inspection for any pin stretch or box swelling is conducted. If there is any indication of pin stretch or box swelling or both, further quality control (QC) is conducted to dimensional gage the suspect tool joint, including checking box outer diameter, pin length and box depth on double shouldered connections, etc.

Inspection of threads for galling or other damage is done.

Inspection torque shoulders for pickup or tearing. The primary shoulders should have a finish of 150 or less and any scratches across the shoulder are not allowed.

The secondary torque shoulder is not a seal, it is a mechanical stop. The pin nose must be free of raised metal or other imperfections that could prevent proper make up or cause galling. Pin nose damage can be repaired with a hand file. The tubular 10 is then ready for final inspection.

Final Inspection

On good connections: The operator cleans threads and torque shoulders properly and thoroughly coated with an environmentally approved (i.e. "Green") thread storage compound if specified. Heavy duty thread protectors are cleaned and reapplied. "MB" is stamped on the tapered shoulders of box and pin using ¼" low stress stamps. The operator then lightly grinds the raised tong marks flush to outer diameter of tong space.

On galled or otherwise damaged connections: A non-conformance report (NCR) is created, and a number or other unique inspection serial number is applied to the tong space, marking the type of damage on the tong space with permanent marker. A record of the type of damage versus NCR/serial number is made on an inspection report. Light oil is applied and a clean thread protector is installed to protect the connection until it can be further evaluated or reworked. The non-conforming tubular is placed in a separate location. Inspection reports and completed work orders are turned over to purchasing to complete the process.

Joint

Figure 18A:
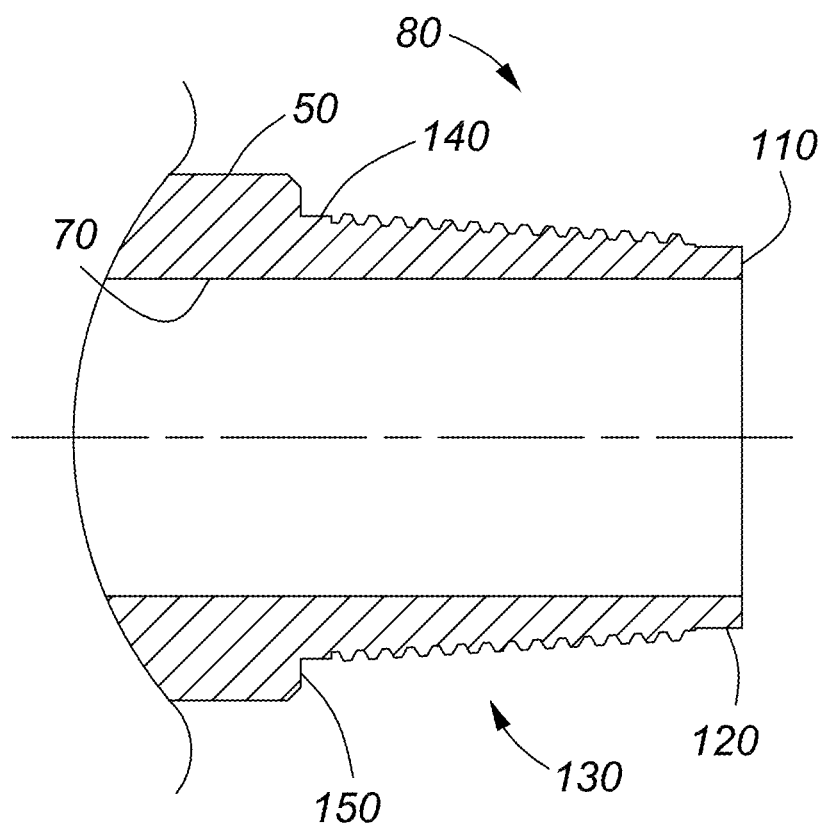
FIG. 18A is a pin connection of FIGS. 8-10 and FIG. 18B is a box connection of FIGS. 15-17, aligned for connection.
Figure 18B:
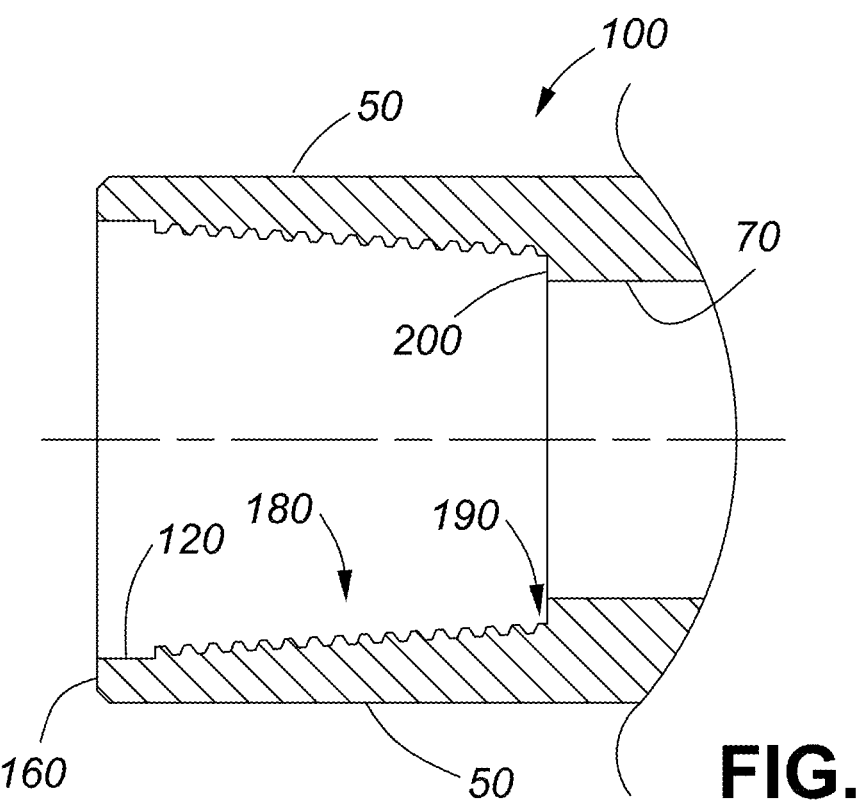
Figure 19:
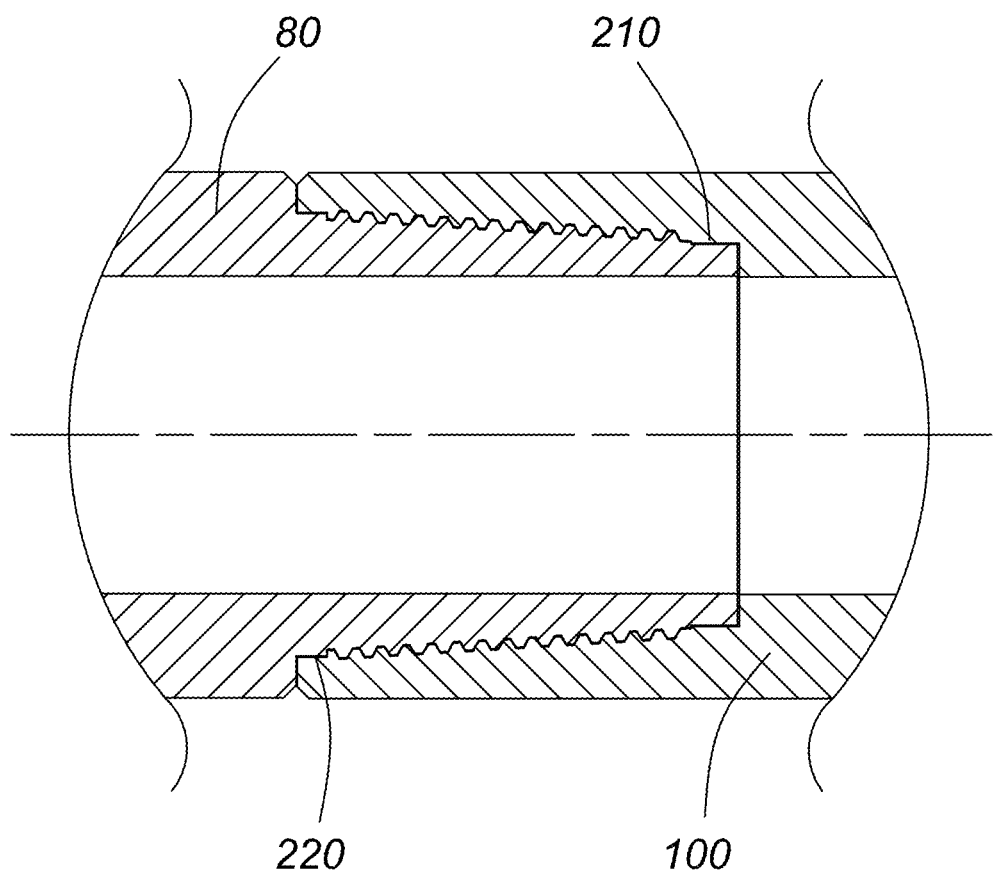
FIG. 19 is the box connection and the pin connection of FIG. 18, connected.
Figure 20:
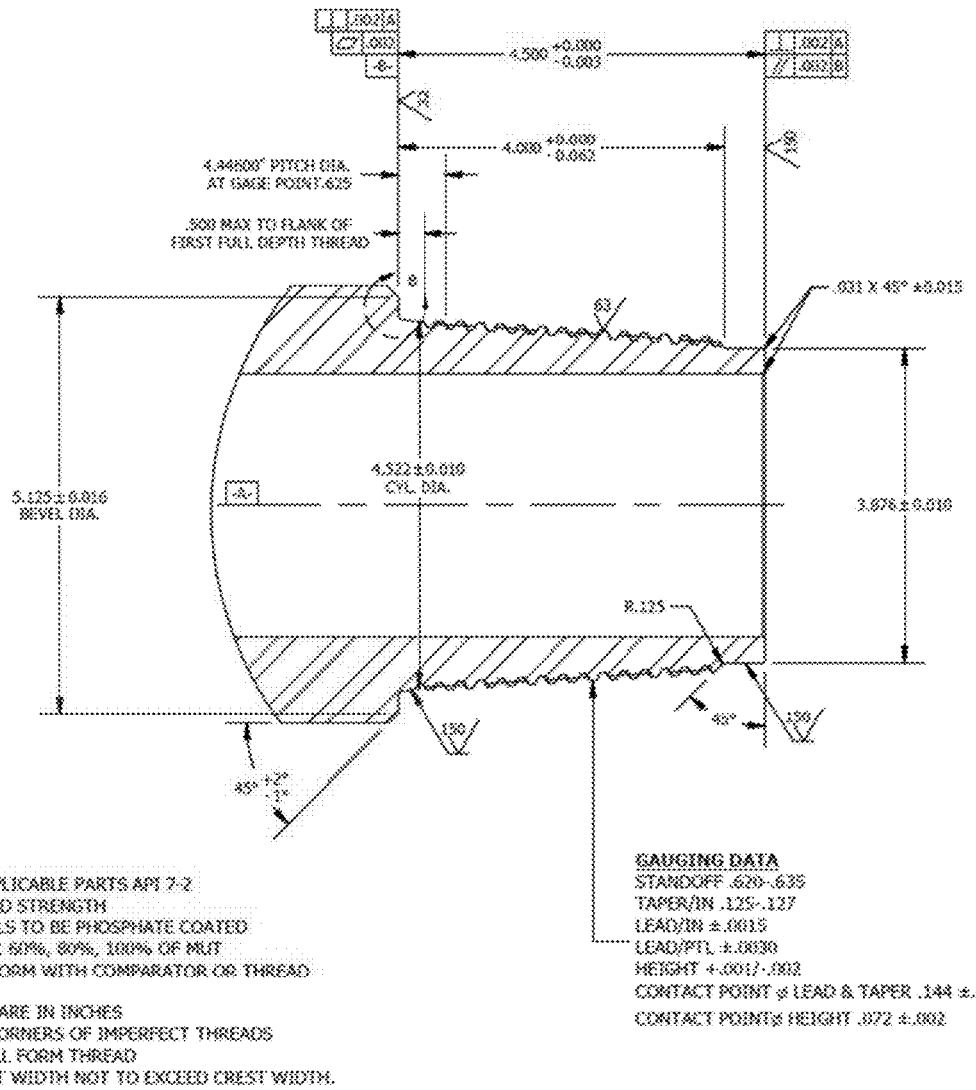
FIGS. 20 to 22 are details of FIGS. 8 to 10.
Figure 21:
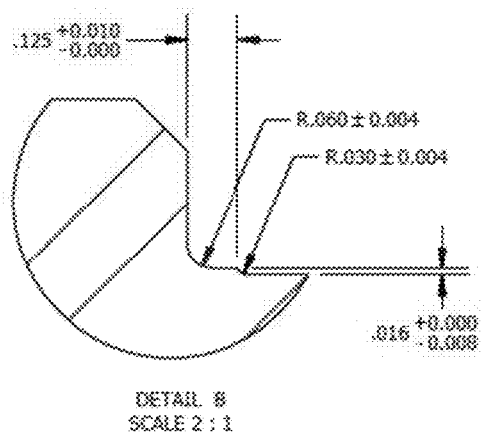
Figure 22:
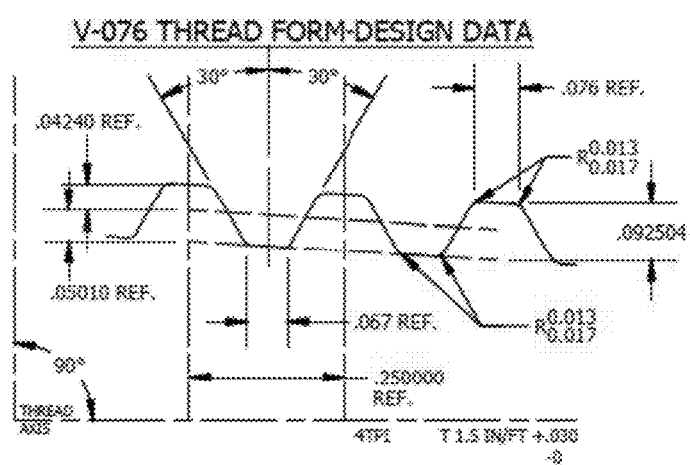
Figure 23:
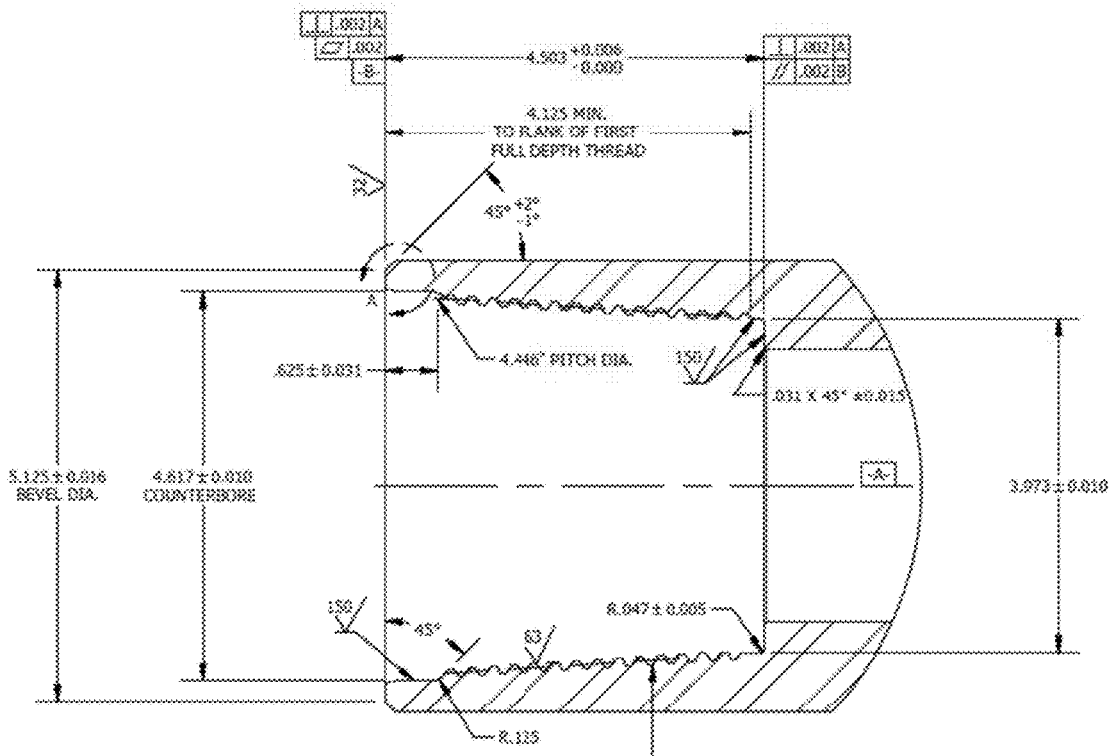
FIGS. 23 to 25 are details of FIGS. 15 to 17.
Figure 24:
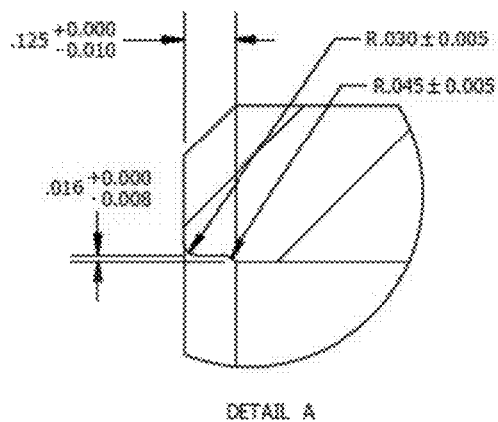
Figure 25:
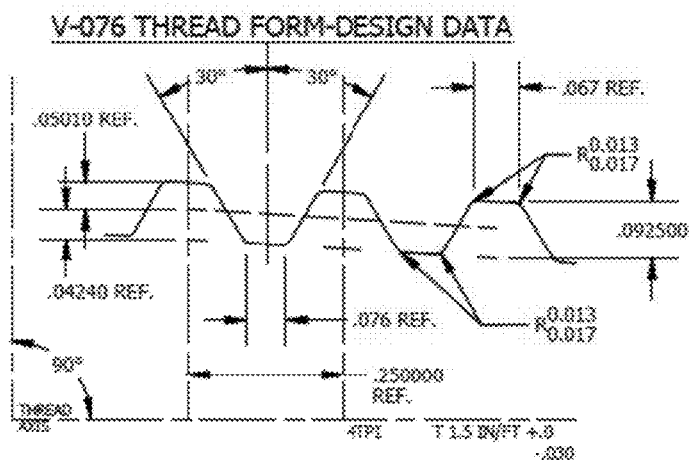

Referring to FIGS. 18A, 18B and 19, the CET®43 pin connection 80 has a nose 110 and a relatively short nose bearing surface 120. A tapered thread 130 extends from the nose bearing surface 130 to a pin shoulder bearing surface 140, and the CET®43 pin connection 80 ends with a pin shoulder stop 150.

The CET®43 box connection 100 has a face stop 160 and a relatively short face bearing surface 170. A tapered thread 180 extends from the face bearing surface 170 to a box shoulder bearing surface 190, and the CET®43 box connection 100 ends with a box shoulder stop 200.

In an embodiment disclosed, the bearing surfaces may be about ½" wide, including the nose bearing surface 120 (and the mating box shoulder bearing surface 190), the pin shoulder bearing surface 140 (and the mating face bearing surface 170), or both.

Referring to FIG. 19, when the CET®43 pin connection 80 and the CET®43 box connection 100 are joined and tightened (e.g. torqued), the nose bearing surface 120 and the mating box shoulder bearing surface 190 are aligned and mated, the pin shoulder bearing surface 140 and the mating face bearing surface 170 are aligned and mated, the nose 110 and the box shoulder stop 200 abut, and the face stop 160 and the pin shoulder stop 150 abut.

In an embodiment disclosed, an annular gap between the bearing surfaces, including annular bearing gap 210 between the nose bearing surface 120 and the mating box shoulder bearing surface 190, and annular bearing gap 210 between the pin shoulder bearing surface 140 and the mating face bearing surface 170, or both, are relatively small. In an embodiment disclosed, the annular bearing gap 210 or the annular bearing gap 220 or both are between about 10 to about 100 thousandths of an inch. In an embodiment disclosed, the annular bearing gap 210 or the annular bearing gap 220 or both is about 0.020 inches. This relatively small gap allows for transfer of at least a portion of the load/stresses (e.g. torque) from the CET®43 box connection 100 to the CET®43 pin connection 80 (or vice-versa) though the bearing surfaces, which lowers the stress on the threads. The CET®43 pin connection 80 is at least partially restrained or constrained by the CET®43 box connection 100 (i.e. the nose bearing surface 120 and the pin shoulder bearing surface 140 of the CET®43 pin connection 80 are constrained by the corresponding box shoulder bearing surface 190 and face bearing surface 170 of the CET®43 box connection 100). When rotational torque is applied to the tubular 10, the torque is spread among the tapered threads as well as the bearing surfaces. As a result, the CET®43 connection can handle more torque than the threads alone could handle.

Recut

As known to one skilled in the art, as threads become used or damaged, they may be recut. When recut, the remaining tong space is reduced. The CET®43 Threads permit one or more, recuts, while maintaining a sufficient tong space. In an embodiment disclosed, several recuts may be made, while maintaining a 9"-12" tong space.

Embodiments

In the preceding description, for purposes of explanation, numerous details are set forth in order to provide a thorough understanding of the embodiments. However, it will be apparent to one skilled in the art that these specific details are not required. In other instances, well-known structures and components are shown in general form in order not to obscure the understanding.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method comprising:
   providing a tubular having an NC46 box connection and an NC46 pin connection;
   reducing a box outer diameter of the NC46 box connection and enlarging a box inner diameter of the NC46 box connection to provide a prepared box connection;
   applying a box premium thread to the prepared box connection;
   reducing a pin outer diameter of the NC46 pin connection and enlarging a pin inner diameter of the NC46 pin connection to provide a prepared pin connection; and
   applying a pin premium thread to the prepared pin connection, wherein the tubular is provided with a box premium connection and a pin premium connection, wherein the box premium thread comprises a CET®43 box thread, wherein the pin premium thread comprises a CET®43 pin thread, and wherein the box premium connection and the pin premium connections are CET®43 connections.

2. The method of claim 1, further comprising heating a hardband portion of the NC46 box connection to about 950 degrees Fahrenheit prior to reducing the outer diameter.

3. The method of claim 1, further comprising phosphating the CET®43 connections.

4. The method of claim 3, further comprising applying a make and break process to the CET®43 connections.

5. The method of claim 1, wherein the CET®43 connections have an outer diameter of about 5.375" and wherein the CET®43 connections have an inner diameter of about 3".

6. The method of claim 1, wherein the CET®43 box threads have a pitch of about 0.25" (4 TPI), an angle of about 60 degrees, a crest to root height of about 0.092500", a taper of about 1.5 in/ft, a crest width of about 0.067", and a root width of about 0.076".

7. The method of claim 1, wherein the CET®43 pin threads have a pitch of about 0.25" (4 TPI), an angle of about 60 degrees, a crest to root height of about 0.092504", a taper of about 1.5 in/ft, a crest width of about 0.076", and a root width of about 0.067".

8. The method of claim 1, wherein the tubular is previously used or is reconditioned.

9. The method of claim 1, further comprising performing a wellbore operation using the tubular having CET®43 connections.

10. The method of claim 9, wherein the wellbore operation comprises horizontal drilling or hydraulic fracturing or both.

11. A method of converting a tubular having NC46 connections to CET®43 connections, comprising:
    providing the tubular, having an NC46 box connection and an NC46 pin connection;
    heating a hardband portion of the NC46 box connection to about 950 degrees Fahrenheit and reducing a box outer diameter of the NC46 box connection;
    enlarging a box inner diameter of the NC46 box connection, wherein a prepared box connection is provided;
    applying a CET®43 box thread to the prepared box connection, wherein the CET®43 threads have a pitch of about 0.25" (4 TPI), an angle of about 60 degrees, a crest to root height of about 0.092500", a taper of about 1.5 in/ft, a crest width of about 0.067", and a root width of about 0.076";
    reducing a pin outer diameter of the NC46 pin connection; enlarging an inner diameter of the pin connection, wherein a prepared pin connection is provided; and
    applying a CET®43 pin thread to the prepared pin connection, wherein the CET®43 threads have a pitch of about 0.25" (4 TPI), an angle of about 60 degrees, a crest to root height of about 0.092504", a taper of about 1.5 in/ft, a crest width of about 0.076", and a root width of about 0.067".

12. The method of claim 11, wherein the CET®43 connections have an outer diameter of about 5.375" and wherein the CET®43 connections have an inner diameter of about 3".

* * * * *